C. M. AUMENT.
AUTOMOBILE BRAKE.
APPLICATION FILED AUG. 23, 1915.
1,209,375.
Patented Dec. 19, 1916.
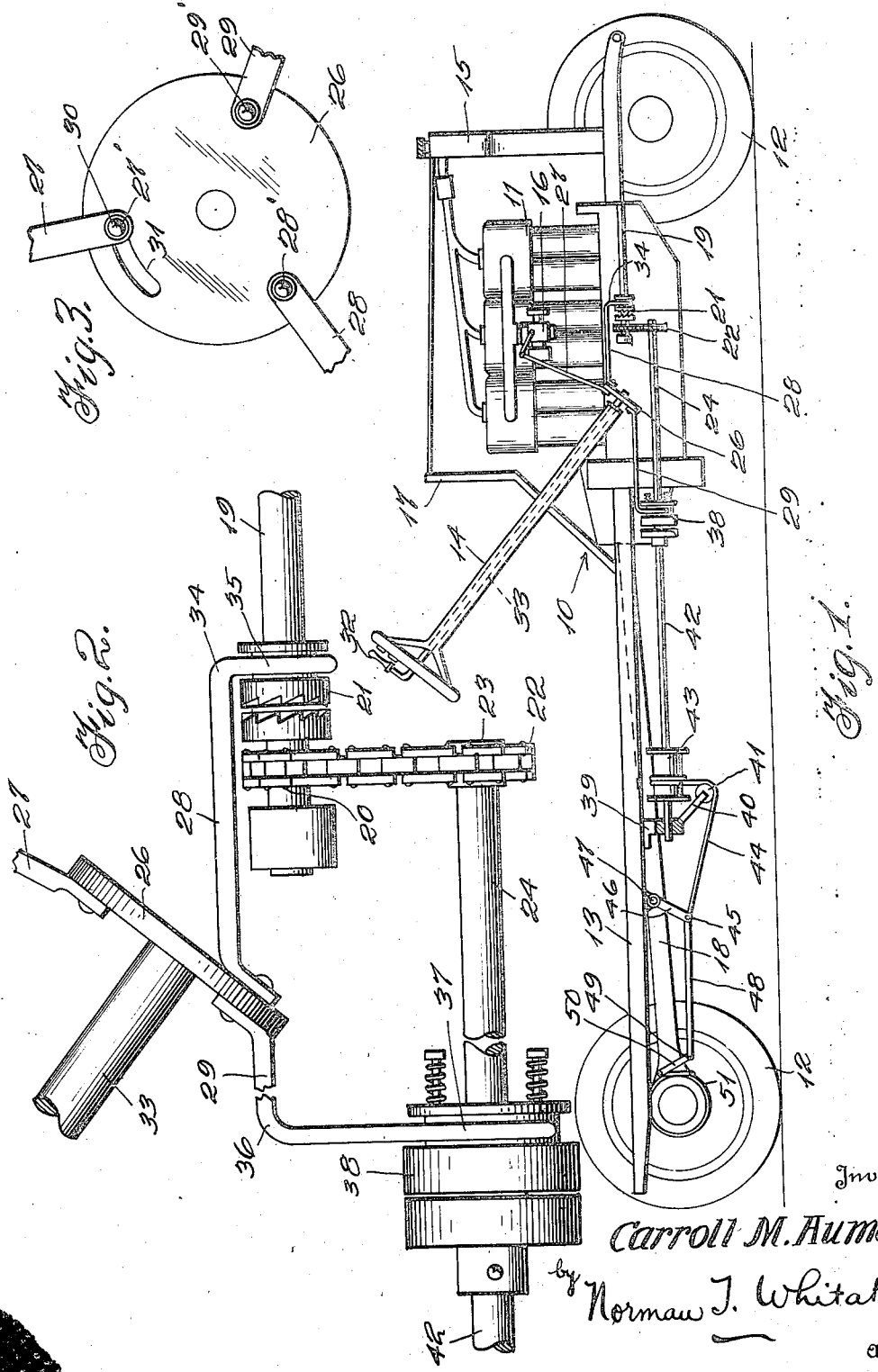
Inventor
Carroll M. Aument,
by Norman T. Whitaker
Attorney

UNITED STATES PATENT OFFICE.

CARROLL M. AUMENT, OF STRASBURG, PENNSYLVANIA, ASSIGNOR OF ONE-HALF TO NORMAN T. WHITAKER, OF NEW YORK, N. Y.

AUTOMOBILE-BRAKE.

1,209,375.  Specification of Letters Patent.  Patented Dec. 19, 1916.

Application filed August 23, 1915. Serial No. 47,013.

*To all whom it may concern:*

Be it known that I, CARROLL M. AUMENT, a citizen of the United States, residing in Strasburg, county of Lancaster, State of Pennsylvania, have invented new and useful Improvements in Automobile-Brakes; and I do hereby declare the following to be a full, clear, and exact description of the invention, such as will enable others skilled in the art to which it appertains to make and use the same.

The invention relates to automobile brakes and has for its object a simple, durable and inexpensive brake, which is actuated by a handle in the steering column and which gets its power from the motor of the automobile itself. The operation of the brake is solely mechanical,—that is, no electrical controlling means is used—thus avoiding the annoyance and inconvenience which is common in electrical controlling means.

The above and other objects and advantages of my improvement will fully appear from the following description taken in connection with the accompanying drawings and will be explicitly defined in the appended claims. I wish it understood, however, that this disclosure is illustrative only and that the principle of my invention can be embodied in constructions other than the one here specified.

Similar characters of reference are employed to indicate the same part throughout the several views.

Figure 1 shows a common automobile construction with the structure of my invention applied thereto. Fig. 2 is a diagrammatic view of the attachment removed from the automobile. Fig. 3 is an enlarged detail view of a portion of the actuating mechanism.

At 10 is shown an automobile with motor 11 and wheels 12.

The numeral 13 refers to the frame, 14 to the steering column, 15 to the radiator and 16 to the carbureter. The dash board is shown at 17 and the driving shaft at 18. The numeral 19 indicates a shaft which is driven by the motor itself.

A gear wheel 20 is loosely mounted on the shaft 19 and mounted on the same shaft is a dog clutch 21 which, as clearly shown in Fig. 2, meshes with the gear wheel 20 under certain conditions which will hereinafter be explained.

A silent chain 22 is mounted on gear wheel 20 and at the lower end to gear wheel 23 which is indicated on shaft 24.

Mounted in the steering column is rod 33 having handle 32 on the upper end thereof and plate 26 on the lower end thereof. As clearly shown in Fig. 3, the plate 26 has connected to it, three rods, 27, 28 and 29 pivotally mounted at 27', 28' and 29' respectively. Rod 27 is pivotally mounted at 27' to a pin 30 which slides in an arcuate slot 31. Upon the handle 32 and rod 33 being turned, the plate 26 will be turned which will simultaneously actuate rods 27, 28 and 29. Rod 27 is connected to the carbureter 16 and is used to open and close the throttle valve connected to the carbureter. By means of the arcuate slot 31, the rod 27 of the carbureter will not actuate the carbureter until the plate 26 has been turned through a number of degrees.

The function of rod 27 is to slightly increase the speed of the motor so as not to stall it if the brakes are applied too severely. The rod 27 by means of the arcuate slot does not act until the brakes are partly applied as it is not necessary because there is not enough power needed until then. If there is a governor on the motor as supplied by some makes of cars, then the rod 27 would not be needed.

Rod 28 is bent at 34 to form a yoke or collar 35 which actuates part 21, as clearly shown in Fig. 2.

Rod 29 is bent in a similar manner as at 36 to form a yoke or collar 37 which actuates a slipping clutch diagrammatically shown at 38.

Mounted on the under face of the chassis 13 is a bearing 39 having an obliquely disposed extension 40 in which is mounted a roller 41. A shaft 42 has one of its ends journaled in the bearing 39 and the other end is operatively connected with the slipping clutch 38. Rigidly mounted on the shaft 42 is a drum 43. A cable 44 has one of its ends connected with the drum 43. This cable is wound around the drum, passed over the roller 41 and is connected at 45 to an arm 46 pivotally connected to the under side of the chassis at 47. A link 48 is also connected at 45 to an arm 46 and has its other end connected at 49 to a link 50. This link is pivotally connected to a brake band 51 of a conventional type.

It is believed that, from the above detailed explanation, the operation of the brake through the actuation of handle 34 is clear.

No great expenditure of physical energy is necessary to manipulate the brakes as the power to operate the brakes is derived solely from the motor of the automobile itself. Furthermore, no annoying and cumbersome electrical means is used and the improvement is simple, durable and inexpensive.

Having described my invention, what I believe to be new and desire to secure and protect by Letters Patent of the United States is:—

1. An automobile brake including a power transmitting shaft actuated by the automobile motor, a rotatable shaft mounted to the rear of said first mentioned shaft to actuate said brake, and a slipping clutch interposed between said shafts, said clutch being operated by the driver.

2. The combination with a motor vehicle having a brake, of rotatable shafts being actuated by the motor, a slipping clutch interposed between said shafts, said clutch being actuated by a linkage, said linkage being adapted to be operated by the driver.

3. In an automobile brake, a rod mounted in the steering column, a handle mounted on said rod to actuate the same, a rotatable shaft receiving power from the automobile motor, a rotatable shaft to actuate the brake, a slipping clutch mounted between said shafts, and linkage between the rod in the steering column and said clutch whereby the brake will be actuated upon movement of the handle.

4. In an automobile, a brake, said brake being actuated by the motor of the automobile, and means to slightly increase the power of the motor when said brake is applied to prevent the stopping of said motor.

5. An automobile brake including a power transmitting shaft actuated by the automobile motor, a rotatable shaft mounted to the rear of said first mentioned shaft to actuate said brake, a clutch interposed between said shafts, and means to slightly increase the power of the motor when said brake is applied to prevent the stopping of said motor.

CARROLL M. AUMENT.